US010503623B2

(12) United States Patent
Keller (10) Patent No.: US 10,503,623 B2
(45) Date of Patent: Dec. 10, 2019

(54) MONITORING CONTAINERIZED APPLICATIONS

(71) Applicant: CA, Inc., New York, NY (US)

(72) Inventor: Adam George Keller, Barrington, NH (US)

(73) Assignee: CA, Inc., New York, NY (US)

(*) Notice: Subject to any disclaimer, the term of this patent is extended or adjusted under 35 U.S.C. 154(b) by 299 days.

(21) Appl. No.: 15/142,918

(22) Filed: Apr. 29, 2016

(65) Prior Publication Data

US 2017/0315795 A1 Nov. 2, 2017

(51) Int. Cl.
  G06F 9/44    (2018.01)
  G06F 11/30   (2006.01)
  G06F 9/54    (2006.01)
  G06F 11/34   (2006.01)
  G06F 9/455   (2018.01)

(52) U.S. Cl.
  CPC ...... *G06F 11/3006* (2013.01); *G06F 9/45558* (2013.01); *G06F 9/542* (2013.01); *G06F 11/3409* (2013.01); *G06F 11/3476* (2013.01); *G06F 11/301* (2013.01); *G06F 11/302* (2013.01); *G06F 11/3452* (2013.01); *G06F 2009/45591* (2013.01); *G06F 2201/805* (2013.01); *G06F 2201/865* (2013.01)

(58) Field of Classification Search
  CPC .... G06F 11/3051; G06F 11/3476; G06F 8/60; G06F 8/65
  See application file for complete search history.

(56) References Cited

U.S. PATENT DOCUMENTS

2005/0149535 A1* 7/2005 Frey ............... G06F 11/3636
2007/0168919 A1* 7/2007 Henseler ............... G06F 8/61
                                                        717/101

(Continued)

OTHER PUBLICATIONS

Collins, "Developing With Docker—The Debug Container", [online blog] retrieved on Apr. 29, 2016 from http://www.alexecollins.com/developing-with-docker-debug-container/, Dec. 9, 2015, 5 pages.

(Continued)

*Primary Examiner* — Duy Khuong T Nguyen
(74) *Attorney, Agent, or Firm* — Gilliam IP PLLC (57) ABSTRACT

Methods and systems for monitoring containerized applications are disclosed herein. In one aspect, a containerized application that includes application program instructions and application runtime environment components is installed within an application server. An application manager determines an operational configuration of the containerized application within the application server. The application manager determines a monitor container image based, at least in part, on the determined operational configuration and an application container image of the containerized application. The application manager installs the monitor container image as a containerized monitor application that includes monitor program instructions and monitor runtime environment components that operate as a distinct execution unit managed by the same virtualization engine and the operating system kernel that manage runtime processes of the containerized application.

20 Claims, 6 Drawing Sheets

(56) References Cited

U.S. PATENT DOCUMENTS

| | | | | |
|---|---|---|---|---|
| 2010/0122175 | A1* | 5/2010 | Gupta | H04L 41/0893 |
| | | | | 715/735 |
| 2015/0149424 | A1* | 5/2015 | Margalit | G06F 11/3476 |
| | | | | 707/695 |
| 2016/0330277 | A1* | 11/2016 | Jain | H04L 67/1095 |
| 2016/0342401 | A1* | 11/2016 | Keis | G06F 8/61 |
| 2017/0098072 | A1* | 4/2017 | Stopel | G06F 21/554 |

OTHER PUBLICATIONS

Collins, "Developing With Docker—Using a Proxy Container to Make Development Easier", [online blog] retrieved on Apr. 29, 2016 from http://www.alexecollins.com/developing-with-docker-proxy-container/, Nov. 28, 2015, 7 pages.

Docker, "Understanding Docker Data Storage and Persistence", Docker White Paper, retrieved on Apr. 28, 2016 from https://www.docker.com/sites/default/files/Understanding-Docker-Data-Storage-WP-rev3.pdf, Mar. 24, 2016, 6 pages.

Linux, "Linux Containers", [online] retrieved on Apr. 27, 2016 from https://linuxcontainers.org/lxc/getting-started/, Feb. 5, 2015, 5 pages.

\* cited by examiner

MONITORING CONTAINERIZED APPLICATIONS

BACKGROUND

The disclosure generally relates to the field of computer systems, and more particularly to troubleshooting software applications.

Instrumentation enables the observance and/or capture of the application's performance data. However, instrumentation may be obtrusive since code snippets are introduced in the production code. In addition, there is a risk of degrading the application's performance because of the runtime overhead of instrumentation library calls. The ability to rapidly deploy applications or tools in any environment is essential when timing is of utmost importance such as when troubleshooting production software issues. In addition, it is frequently important to distribute the application as a uniform (i.e., unmodified) product on computer terminals, data centers, virtual machines (VMs), and cloud implementations.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without some of these specific details. In other instances, well-known instruction instances, protocols, structures and techniques have not been shown in detail in order not to obfuscate the description.

Overview

Operating system virtualization (often called containerization) is an abstraction of an operating system (OS) kernel that is used to isolate user space instances for a host OS. Common usage of such virtualization may include a packaging system for software applications along with dependencies allowing the applications to run on any infrastructure thereby simplifying deployment.

The ability to virtualize applications such as via containers enables isolation of specific code, applications, and processes. In addition, virtualization allows for applications to be configured and packaged with dependencies such as required binaries and libraries. As issues occur in the production environment, the ability to quickly deploy tools and/or applications to collect and analyze information without affecting or altering the running application is crucial. Time spent configuring the tool and establishing connection with the application may interfere with product and monitoring operation. For example, a dump file collected at the point an application crashes may be utilized to diagnose an underlying problem while a dump file collected several minutes after the crash may be unhelpful. The ability to quickly deploy self-contained, pre-configured applications that detect, collect, and analyze relevant information can assist in troubleshooting production software issues or in performing root cause analysis.

The present disclosure describes systems and methods for monitoring and debugging a containerized application in a production environment. The monitoring and debugging may be performed remotely or otherwise, without altering the state of the application such as by deploying a containerized monitoring application to monitor the application. As disclosed herein, a containerized application may be characterized as an application-level (user level) program that executes within a container. Containerizing an application provides benefits such as the ability to release software more quickly, the ability to isolate the application and resources it uses, and the ability to securely link one containerized application to another for document sharing for example.

Disclosed herein is an application management system that deploys monitor applications quickly in almost any infrastructure. Monitor applications may be hosted in application containers, enabling dynamic component configuration (e.g., Java Database Connectivity (JDBC)) of each container as required. For example, based on a target application configuration, a container that hosts a database monitoring system may be dynamically linked to the monitor application. The monitor application is configured to capture performance or behavioral data, event traces and other pertinent information specific to a certain application without the need to instrument the containerized application, reducing the risk of changes in the way the application behaves or performs. The monitor application may be deployed dynamically to provide profiling, tracing and real-time monitoring of a containerized application operating in a processing environment without disrupting or altering the environment's current state. In addition, the monitor application may be configured to gather and analyze data specific to a particular containerized application, thus providing optimal detail and accuracy required when quickly troubleshooting application production issues compared to a generic monitoring application.

In order to monitor a containerized application and its constituent components, the monitor application collects or otherwise determines configuration information for the resource. Based on the configuration information, the monitor application collects operational data which may be used to troubleshoot and diagnose issues. Collected operational data may include, for example, information extracted from HTTP requests/responses regarding levels and types of network traffic between a client and a containerized application. Operational data may also include system and application performance metrics such as processing speed and throughput associated with operations of the components, devices, subsystems and systems within an application execution environment. Operational data may also include information regarding access by the containerized application to stored application data such as may be recorded in an application database. The database access information may include numbers of reads or writes executed between the application and the database. The monitor application may be further used to debug the containerized application in real time in a development environment, and also to retroactively analyze issues in a production environment. These operational data may be persisted in a database for example, to be used for analysis of future issues.

The monitor application may be managed by an application manager and typically includes a database that records the components, devices, subsystems as well as the data collected from the containerized application and/or its host.

Example Illustrations

Figure 1:
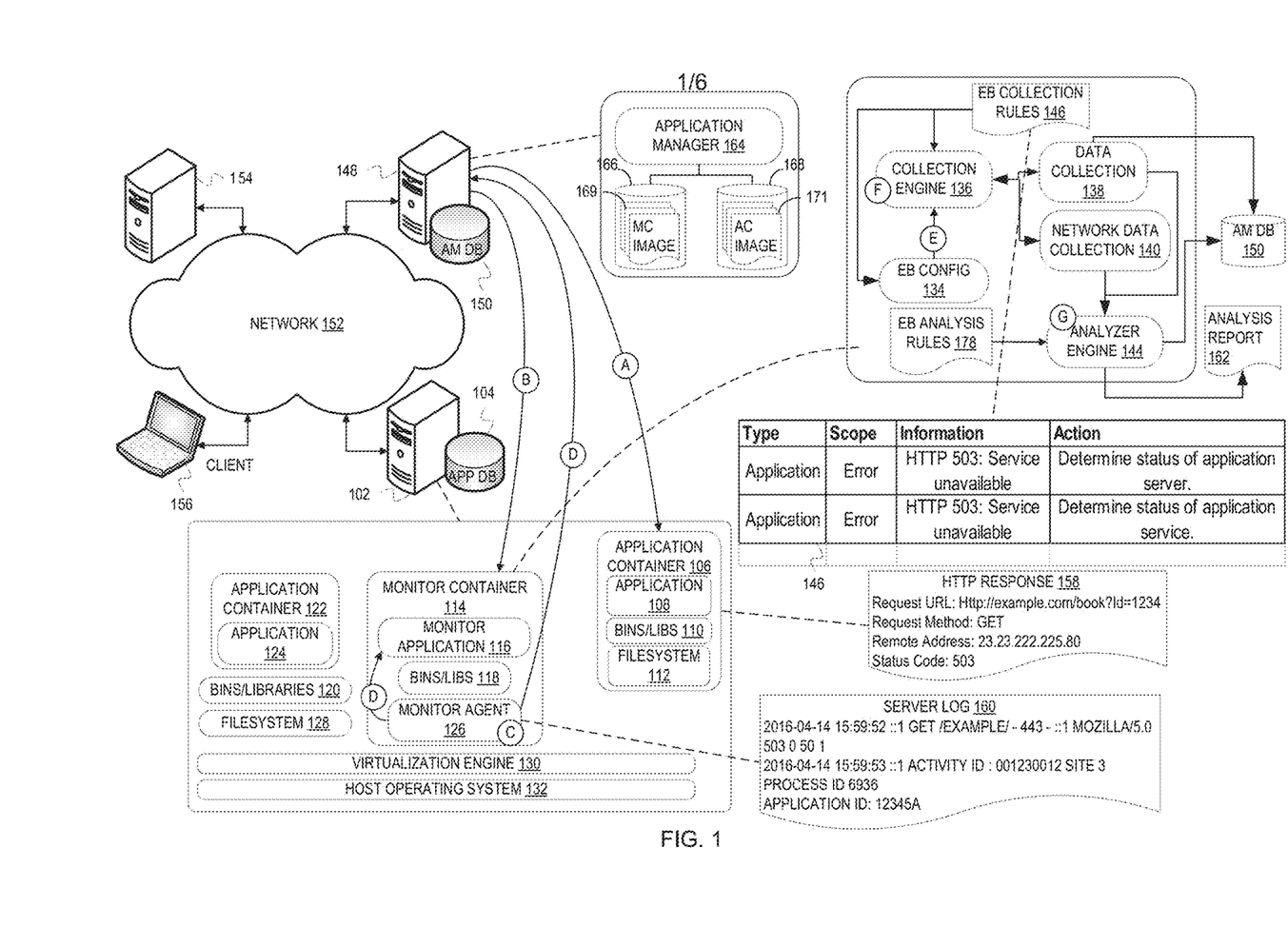
FIG. 1 is a block diagram depicting an application management system in accordance with some embodiments.
Figure 2:
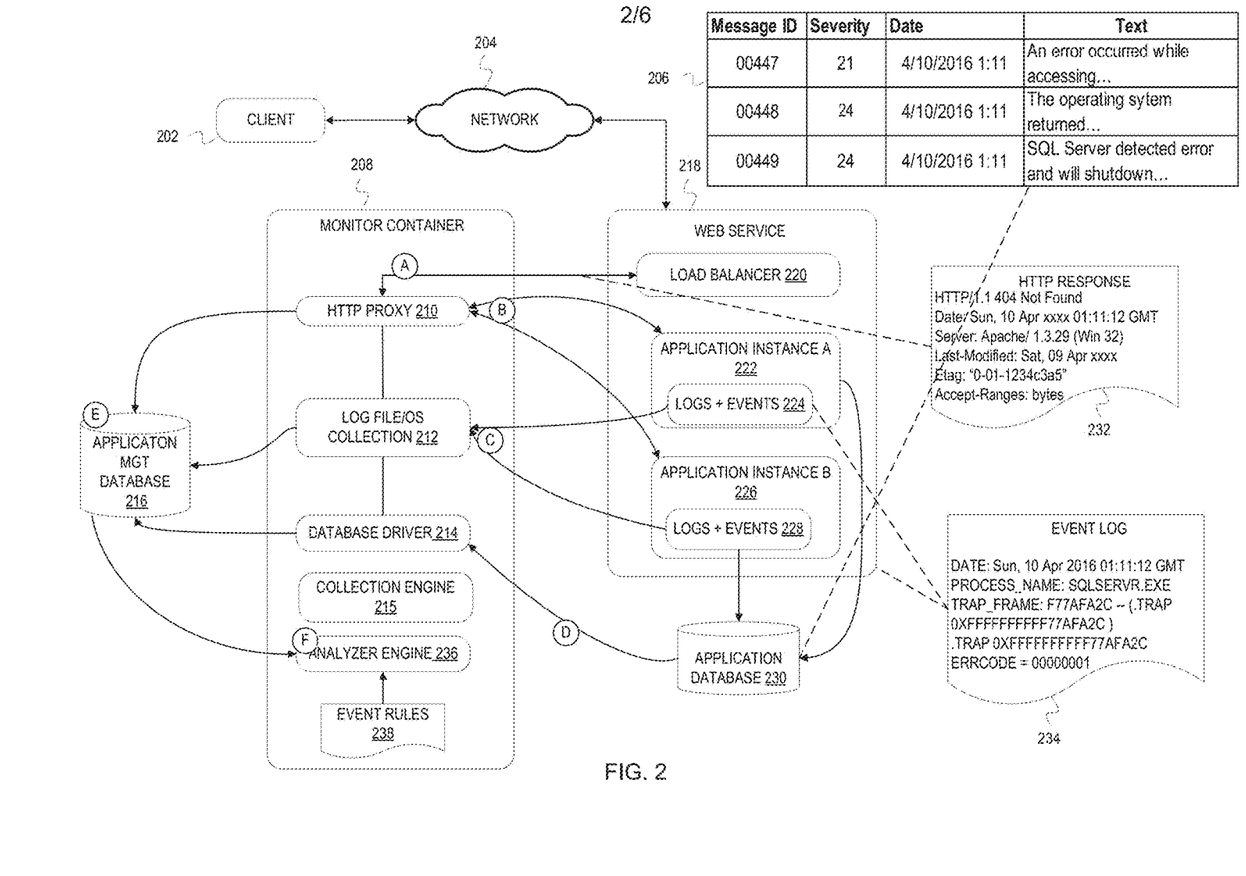
FIG. 2 is a block diagram illustrating deployment of a containerized monitor application within an application management system in accordance with some embodiments.

FIGS. 1 and 2 are annotated with a series of letters A-G that represent stages of operations. Although these stages are ordered for this example, the stages illustrate one example to aid in understanding this disclosure and should not be used to limit the claims. Subject matter falling within the scope of the claims can vary with respect to the order and some of the operations.

Conventional data collection for debugging purposes typically entails instrumenting the target application itself. Instrumenting an application generally refers to inserting instrumentation code into an application program to record the parameter values, timing data, and other information necessary to troubleshoot or debug the application. Instrumentation code may also be statically or dynamically linked to the application code. The disclosed embodiments deploy containerized monitor applications in a manner enabling collection of operational data associated with execution of target applications without inserting or linking instrumentation code.

FIG. 1 depicts a conceptual example of a virtualized application management system that configures and deploys containerized monitor applications in association with target applications to be monitored. The application management system includes an application management server 148, application servers 102 and 154, and a client 156. The application server 102 hosts a monitor container 114 and application containers 106 and 122. A container is a form of OS-level virtualization that consists of a runtime environment for an application program. A container typically includes the application program itself and further includes runtime dependencies of the application program such as libraries and other binaries and configuration files, wrapped in one package. A container may be initially constructed as a container image that includes the program instructions and dependency artifacts.

Once the container is installed, the resident application becomes "containerized," with multiple containerized applications possibly installed and executing on a given host device. Each of the installed containers shares an operating system kernel with other containers for handling and coordinating runtime operations. Shared parts of the operating system may be read only, with each container having its own mount (i.e., a way to access the container) for writing. By sharing a common operating system kernel for runtime operations, containers impose considerably less overhead than virtual machines that are characterized, in part, as including a guest operating system for each respective virtual machine. Each container may be configured for a particular type and version of operating system. For example, a distinct container image may be required for each category of Linux operating system (e.g. Red Hat®, Suse®). In addition, if the application program hosted by the container requires a web browser, each respective container image may include a different version of the web browser.

The application container 106 hosts an application 108, binaries/libraries 110, and a file system 112. The application container 122 hosts an application 124. The monitor container 114 includes a monitor application 116 and associated binaries/libraries 118. Components of the monitor application 116 include an event based configuration unit 134 and a collection engine 136. The configuration unit 134 is configured, using any combination of coded software, firmware, and/or hardware, to determine the operational configuration of the containerized applications 108 or 124. The collection engine 136 is configured to dynamically configure a data collection unit 138 and a network data collection unit 140 based, at least in part, on the determined operational configuration of the target application and a set of one or more event-based collection rules 146. The data collection unit 138 and the network data collection unit 140 collect data associated with operations of a target application, such as one of the containerized applications 108 and/or 124, and records the data or processed results from the data to the application management database 150.

The application management server 148 hosts an application manager 164 that is configured, using any combination of coded software, firmware, and/or hardware, to install or otherwise deploy application containers in the application server 102. The application manager 164 is further configured to install or otherwise deploy monitor containers in association with one or more of the installed application containers. As illustrated, the application manager 164 is communicatively coupled with a monitor container registry 166 and an application container registry 168. A set of monitor container images 169 is stored in the monitor container registry 166 and a set of application container images 171 is stored in the application container registry 168. Each of the monitor container images 169 may comprise a file or other registry entry having a container ID, a monitor application program, and a corresponding set of runtime environment components. Each of the application container images 171 may comprise a file or other registry entry having a container ID, a monitor application program, and a corresponding set of runtime environment components.

The virtualization engine 130 depicts the tool set and/or API for managing the application and monitor containers that operates with the application manager 164. For example, when application manager 164 needs a base image that is not available in its repositories, the application manager 164 can request the virtualization engine 130 for a base image file. Host Operating System 132 depicts the operating system running on application server 102. The application containers 122, 106 and monitor container 114 typically are of the same OS and version as the host operating system 132.

At stage A, the application manager 164 installs the application container 106 within the application server 102. For instance, the application manager 164 may write one of application container images 171 to application server 102. Whether written from application manager 164 or elsewhere, the application container image includes components that are read and installed by application server 102 to become deployed as operational containerized application 108 and associated runtime components including bins/libs 110 and file system 112. During installation/deployment, the application container 106 undergoes operational configuration such as establishing connections such as with the application database 104.

As part of stage A, the application manager 164 determines operational configuration information for the containerized application 108. The operational configuration comprises the software and/or hardware components and connectivity/interface information for the target application. For example, basic operational configuration information for a web service application include the type of implementation, (e.g., Java class packaged in a web application archive file) and database information (e.g., database type and connection settings). In Java applications, configuration data may be stored in a properties file that may be accessed and read by the application manager 164. Various tools and/or techniques can be used to access and read information from the properties file, an example of which is the java.util.Properties class. For example, the application manager 164 may issue an application program interface (API) call to access a properties file within the file system 112 to determine operational configuration information such as database connection information including a uniform resource identifier (URI) address that the containerized application 108 uses to access the application database 104.

As part of stage A, the application manager 164 also determines resource dependency information for the containerized application 108. In some embodiments, the application manager 164 may determine the resource dependency information from the application container image from which the containerized application 108 was installed. Such information may include the identities of runtime support components such as the file system 112 and bins/libs 110.

In some embodiments, the application manager 164 may select or otherwise determine a monitor container image based, at least in part, on the operational configuration and the resource dependencies of the containerized application 108. The operational configuration may be determined from configuration information collected from the installed application container 106 and recorded in application management database 150. In addition, or alternatively, the operational configuration information may be determined by a currently installed base monitor container (not depicted). The application manager 164 also utilizes the operational configuration information and resource dependency information from the application container image to select or otherwise determine a monitor container image.

The application manager 164 is configured, using any combination of coded software, firmware, and/or hardware, to select or otherwise determine monitor container images to be deployed as containerized monitor applications, such as containerized monitor application 116. In some embodiments, the application manager 164 accesses the registry 166 of monitor container image files 169 to select a monitor container image based on the operational configuration of the application 108 and the dependency resources in the monitor container image from which the application was installed.

At stage B, the application manager 164 installs or otherwise deploys the monitor container 114 to application server 102 using the selected monitor container image from the monitor container repository 169. The monitor container 114 includes the monitor application 116 and the binaries/libraries 118. Installed as a runtime execution unit within a system, such as application server 102, the monitor application 116 becomes a containerized application within the monitor container 114. The monitor container 114 is pre-packaged with a number of resource dependencies, referred to alternately as runtime environment components, for the monitor application 116. Such runtime environment components (runtime dependencies for monitor application 116) may include, for example, Java Database Connectivity (JDBC) and Java Runtime Environment (JRE) code in addition to the binaries and libraries 118. As depicted, the monitor application 116 comprises an event based configuration unit 134, a collection engine 136, a data collection unit 138, a network data collection unit 140, and an analyzer engine 144.

The monitor container 114 further includes a monitor agent 126 that is configured to detect specified operating conditions that, alone or in various combinations, are classified as events and are recorded with respectively assigned event identifiers in the application management database 150. The monitor container 114 may operate in a default mode in which the containerized monitor application 116 is largely inactive pending detection of one or more specified events. At stage C, the monitor agent 126 detects one or more events associated with the operation of the application 108. An event can widely vary depending on the particular aspect(s) of the application being monitored. For example, an error or exception generated by application 108 or client 156 may be classified as an event. An error event may result from sub-event occurrences or conditions such as an incorrect host name, incorrect ID in the query, or a system failure. As another example, a particular network measurement/metric (e.g. CPU utilization) exceeding a threshold in association with operation of an application may be classified as an event having an assigned event ID.

The monitor agent 126 is configured to detect events associated with a containerized application based on the configuration of the containerized application. The event report may include a specified event ID, a description of the event, and operational configuration information associated with the event. In FIG. 1, the containerized application 108 is a Representational State Transfer (REST) web service application. Web service applications may propagate error messages using Hypertext Transfer Protocol (HTTP) response status codes having several different classes. A response status code beginning with the digit "5" may indicate that the server is aware of an error or that the server is not capable of performing the request. In the depicted example, containerized application 108 generates an HTTP response 158 specifying status code "503," such as may be transmitted to the client 156. Monitor agent 126 may detect the HTTP response 158 and interpret status code "503" as indicating service unavailability (e.g., server is too busy to service current request to containerized application 108).

The monitor agent 126 may detect and access the HTTP response 158 via a log (not depicted) that the application 108 records HTTP requests and responses to. In addition, the application server 102 may be a web server that also generates logs used by web service applications and accessible by the monitor agent 126. An example log entry is depicted in FIG. 1 as server log entry 160. The server log entry 160 indicates that a GET request encountered a "503" status code with sub code of 0. HTTP error 503 may be interpreted by the monitor agent 126 as a service stoppage or disablement. At stage D, the monitor agent 126 generates and transmits an event report to the monitor application 116 in response to detecting the event. The event report may indicate, for example, that an error event has occurred and may specify event related information in association with an event ID. The event related information may include, for instance, an error code and component and connection identifiers.

At stage D, the monitor agent 126 may also transmit the event report to the application manager 164. After receiving the event report, the application manager 164 stores the event related information contained in the report in association with a report identifier in the application management database 150. In some embodiments, the application manager 164 may determine, based on the event report, whether another monitor container (not depicted) should be installed within the application server 102. In such embodiments, the application manager 164 may select one of the monitor container images 169 based on the operational configuration of the containerized application 108, the resource dependencies included in the monitor container image of application 108, and event related information within the event report.

At stage E, the configuration unit 134 determines additional event based configuration information based on the event report. The configuration unit 134 may identify components of, or external to the containerized application 108 that are associated with the event. The configuration unit 134 may parse a properties file within the file system 112 to determine, based on the event related information in the event report, which components are associated with the event. For example, based on event rule as depicted in table 146 a 503 service unavailable error requires an action to determine the status of the application server and/or service. To determine the status of the application server and/or service, the configuration unit 134 may need to query systems views and/or tables. In order to query the system views and/or tables special privileges are required. The configuration unit 134 may query the properties file to get the connection information that has the required privileges such as an administrator account. The configuration unit 134 may also trace a thread or process to identify components invoked by the application 108 and that are associated with the event based on the event related information. The configuration unit 134 may also determine application implementation (e.g., Java class packaged in a web application archive file) and database information (e.g., database type and connection settings). At stage E, the configuration unit 134 also sends the event based operational information to the collection engine 136.

At stage F, the collection engine 136 processes the event report and the event-based operational information using various techniques. For instance, the collection engine 136 may identify and select a rule-based response associated with the event identified in the event report or may use statistical analysis to determine a response based on the operational information in the event report. For example, the collection engine 136, leveraging the event-based collection rules 146 and the connection information given by configuration unit 134, determines the status of the application server and/or service by querying the system views and/or tables of the database. System tables store metadata about the database. For example, in an Oracle® database, the view SYS.DBA_ERRORS describes the current errors on all stored objects in the database.

In some embodiments, the collection engine 136 may record a point-in-time image of the current application state to determine additional operational and configuration information for the application server 102.

The response selected or otherwise determined by the collection engine 136 specifies a collection configuration and activation for the data collection unit 138 and/or the network data collection unit 140. The collection engine 136 determines the data to be collected in association with the detected event such as may be utilized for debugging. For example, the collection engine 136 may identify one or more data sources from which to collect backend data (e.g., from an application database), direct application data (e.g., from a log file), and/or network data (e.g., from client network traffic). The required data may consist of utilization, saturation and error metrics. This disclosure has the ability to collect data in various components of the application such as shared libraries JVM, network traffic, database records etc. without the need to access the source or compiled code. The collection engine 136 may deploy data collection unit 138 to intercept calls made by the application 108 at specified locations. In addition, the collection engine 136 may configure, enable, or otherwise deploy the data collection unit 138 to obtain information regarding threads, processes, CPU cycles and read log files.

For instance, data collection unit 138 may utilize configuration information including URI address information to access and monitor transactions between the application 108 and the application database 104. Data collection unit 138 may detect when the application database 104 does not respond to queries by application 108 for example by executing database queries to collect performance statistics such as how many database read/write is performed for a request from application 108. The network data collection unit 140 may monitor network traffic such as by intercepting network traffic between the application 108 and the client 156.

The data collected by the data collection unit 138 and the network data collection unit 140 may be recorded in the application management database 150. Correlations between the metrics captured based on different events can help identify and diagnose application behavior or performance issues. Capturing event traces such as communications between various components may help portray the dynamics of the application. Data collected may provide information regarding errors, saturation and utilization of the application and the various systems connected to the application. This information may include operating systems functions (e.g. page allocation, process scheduling, block-level I/O), events (e.g. stack traces). It may also include obtaining network traces from the communication between the application server and client, and analyzing the traces to identify and extract issues or potential issues such as an exception and the specific error message for example.

The data collected by the collection units 138 and 140 may also be input to and processed by the analyzer engine 144. At stage G, analyzer engine 144 analyzes data collected by data monitor 138 and network monitor 140 stored in application management database 150 by leveraging event analysis rules 178. Analyzer engine 144 uses various techniques in performing data analysis. In one example, the analyzer engine 144 performs analysis by correlating event reports and/or alerts detected. The process of event correlation involves identifying events that have a connection or relationship to one another, such as a temporal connection, cause-and-effect relationship, etc. Correlating events as used herein refers to the identification of this existing relationship and does not include modifying events or data to establish a connection or relationship. For example, an increase in the net user or kernel memory allocated is an indication of a memory leak.

The results of the analysis by the analyzer engine 144 may be recorded in an analysis report 162. The analysis report 162 may specify secondary metrics (e.g., average, standard deviation, etc.) computed from the event related data and the raw data collected by the monitor container. For example, the report may indicate correlations between or among the various events or data and may further indicate potential causal issues. The analysis report 162 may further specify remedial actions. The analysis report 162 may be saved in a text file format or may be displayed in a computer dashboard. The dashboard report may be historical or may be updated by the analyzer engine 144 in real time.

FIG. 2 depicts a containerized monitor application having a dynamic data collection configuration. In the depicted environment, a web service 218 provides application web services to a client 202 over a network 204. The web service 218 is installed in an application server (not depicted) that also hosts a monitor container 208. Monitor container 208 includes monitor application components and also runtime environment components. The monitor application components (i.e., the containerized application) include a network data collection unit in the form of an HTTP proxy unit 210. The monitor application components further include a log file/operating system monitor 212 and a data collection unit in the form of a database driver unit 214. The web service 218 includes a load balancer 220, an application instance A 222 and application instance B 226. The monitor container 208 is communicatively coupled to the web service 218 such as by API calls handled by a host operating system and virtualization engine (not depicted).

The monitor container 208 may initially determine the data to be collected and recorded in the application management database 216. The monitor container 208 also selects, configures, and deploys the appropriate monitors (e.g., network monitor, database monitor) for collecting the data and components (data sources) that the data will be collected from. For example, the monitor container 208 may identify the web service, application instance, and/or client communications from which data will be collected. The monitor container 208 may further determine the specific protocol (e.g. HTTP, FTP) and/or granularity level (e.g. error, critical) to be monitored. Granularity level may include function/method identifiers (e.g. names, class name/method name combinations, etc.) variable names, etc.

The monitor container 208 may use rules and/or heuristics to identify data to be collected. The rules may account for external events, operating conditions, or data. For example, the monitor container 208 may receive messages, such as from an application management server, indicating that a new version of an application has been installed. In response, the monitor container 208 may modify the data collection configuration of the HTTP proxy unit 210 and determine data to commence or reconfigure data collection to account for differences in the application container image of the new application. As described with reference to FIG. 1, an event may trigger the monitor container 208 to initiate data collection. In addition, the monitor container 208 may apply rules to modify the amount of data collected based on available bandwidth. For example, if client 202 is a mobile device, the monitor container 208 may reduce the amount of data collected if client 202 is using a cellular connection instead of a wireless local area network connection.

The selection of a monitor container image corresponding to monitor container 208 may be based in part on a determination that the target applications 222 and 226 are configured in a software as a service (SaaS) client access configuration. In this configuration, the HTTP proxy unit 210 is configured to intermediately receive network traffic between the client 202 and either of applications 222 and 226. At stage A, the load balancer 220 directs requests received from the client 202 to the HTTP proxy unit 210 instead of directly sending the request to application instance A 222 or application instance B 226. At stage B, the HTTP proxy unit 210 collects network traffic between the client 202 and the application instance A 222 and/or application instance B 226. Specifically, the HTTP proxy unit 210 forwards incoming data packets to addresses in web service 218 and outgoing packets to client addresses in the network 204. The HTTP proxy unit 210 directs responses received from application instance A 222 or application instance B 226 to client 202 through load balancer 220 and network 204. The HTTP proxy unit 210 records but does not modify or filter the requests and responses sent and/or received. The collection manager 215 receives and processes the data collected by the HTTP proxy 210. For example, the collection manager 215 may determine, based on data collected by the HTTP proxy unit 210 that a HTTP 404 Not Found error occurred in response to a GET request from the client 202.

At stage C, log file/operating system collection unit 212 collects data from logs 224 and 228. Log files record events and other data about the operations and may be used to determine the operational reliability of the hardware and software infrastructure. Log file/operating system collection unit 212 may use different techniques to collect data from log files and/or event logs. Log file/operating system collection unit 212 may modify and/or filter the data collected. For example, log file/operating system collection unit 212 may be configured to collect data from log files and event logs generated by components (e.g., application database 230) of web service 218. Log file/operating system monitors then determine that event log 234 is related to application database 230 and therefore collect the event log.

In the depicted example, the collection manager 215 may determine, based on data collected by the HTTP proxy unit 210 that an error occurred on Apr. 10, 2016 at 01:11:12 GMT. The log file/operating system collection unit 212 queries log files and event logs 224, 228 and collects information associated with the structured query language (SQL) server engine shutdown event corresponding to Apr. 10, 2016 at 01:11:12 GMT.

At stage D, the database driver unit 214 retrieves data from data store(s) within web service 218. Data also includes any system information regarding the data store such as the data store's operational status. Database driver unit 214 may use different techniques to connect (e.g., JDBC, ODBC) and collect (e.g., executing SQL statement or stored procedures) data from data stores. To retrieve data, the database driver unit 214 queries the application database 230. The query sent to the application database 230 may include appropriate identifiers. Table 206 depicts an example result returned by a query used to retrieve data.

Continuing with the example in which the monitor container 208 determines that a database system error occurred on Apr. 10, 2016 at 01:11:12 GMT, the database driver unit 214 queries the application database 230 for database error at that particular time and determines that the data that SQL server shutdown at said time should be collected.

At stage E, the HTTP proxy unit 210, log file/operating system collection unit 212, and database driver unit 214 record the collected data in the application management database 216. An association between the data collected by the monitors may be created and maintained. In addition, an association to the event notification that triggered the collection of the data may also be created and maintained. Indexes may be created to facilitate quick retrieval of the data stored.

At stage F, the analyzer engine 236 retrieves data from the application management database 216. The analyzer engine 236 determines correlations between the data captured and recorded by the different monitors to help identify and diagnose application behavior or performance issues. The analyzer engine 236 may determine, for example, that the cause of the HTTP 404 not found error is a shutdown of the SQL server engine. The analyzer engine 236 applies event rules 238 to select or otherwise determine an action response to restart the SQL server engine.

Figure 3:
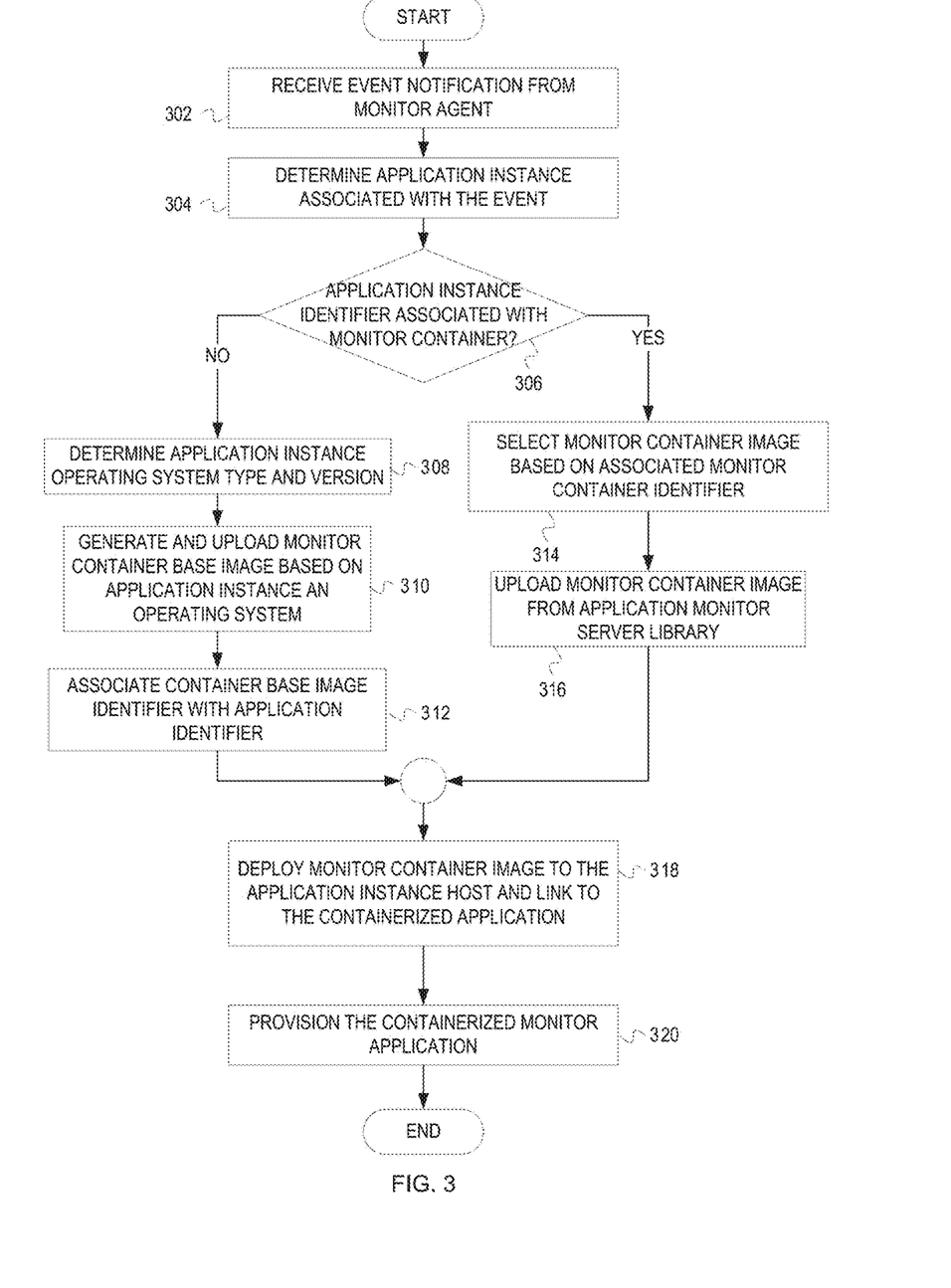
FIG. 3 is a flow diagram depicting operations and functions for processing and deploying a monitor container in accordance with some embodiments.

FIG. 3 is a flow diagram depicting operations and functions for processing and deploying a monitor container in accordance with some embodiments. The operations and functions depicted in FIG. 3 may be performed by one or more of the systems, devices, and components described with reference to FIGS. 1 and 2. The process begins with an application manager receiving an event notification (302). The event notification may be a message specifying an event ID code and/or may be an event report message. The application manager may track events by recording the event with assigning event identifiers. The event notification may include event related data that specifies the IDs of components involved and other metadata associated with a detected event. For example, the metadata can include event characteristics, such as an event indicator (e.g. an event type, indication of a failed process, etc.), a timestamp, an event severity, error code, error message, etc. If the detected event is associated with a particular application instance or process, the metadata can identify the associated application or process (e.g., using application instance or process identifiers). The event indicator can identify the type of event. For example, the event indicator may indicate that a request response returned an error, that a metric exceeded a threshold, etc.

In response to the event notification, the application manager identifies the application instance associated with the event based, at least in part, on one or more event characteristics (304). The event characteristics may be determined using the metadata from the event notification. To identify the application instance, the application manager may use the application instance identifier in the event notification, for example. In another implementation, the application manager may use the event identifier in a query to the application container database to determine the application instance.

After determining the application instance, the application manager determines if application instance is associated with a monitor container (306). The application manager may interpret a flag or may interpret a mapping between the application container image from which the application instance was generated and a monitor container base image. In another implementation, a string value may be used to determine the association.

If the application instance identifier is associated with a monitor container, the application manager selects a monitor container image based on the associated monitor container ID (314). For example, the application manager may read a table that maps and thereby logically associates application instance identifiers (e.g., application container image IDs) with monitor container identifiers (e.g., monitor container image IDs). Having selected the monitor container image, the application manager retrieves and installs the monitor container image as a containerized monitor application (316).

If the application instance identifier is not associated with a monitor container, the application manager determines the application instance's operating system type and version (308). Various techniques may be used in determining the operating system of a container. For example, a table that contains information about the operating system may be maintained and accessed. In another implementation, a command like "uname-a" can be run on the container or the host to determine the operating system type and version. The application manager may then generate and install a monitor container based, in part, on the determined operating system type and version (310). Following generation of the monitor container, the application manager records the monitor container image data in association with an assigned ID in the application management database (312).

Using the associated monitor identifier, the application manager determines the monitor application container image to be deployed (316). The application manager may use various techniques in determining the monitor application container image. For example, the application manager can query the container engine. In another implementation, the application manager maintains a map that identifies the location of the monitor container image.

The application manager installs the monitor container on the application instance host and links it to the containerized application (318). The application monitor container may be deployed by the application manager by running a command. For example, the command "docker run -d -name resouce-monitor-name docker.example.com/my-resource-monitor:latest—link web:application1" starts the container from the downloaded image and links it to the containerized web containerized application named application1. Links allow one container to discover the other container and securely transfer information from one container to the other. When containers are linked, information about one container can be sent to the other container.

In addition to or instead of links, network mappings may be created between containers. Containers that are mapped may be able to communicate with each other through internet protocol (IP) addresses. For example, a container may be attached to another container by using the command "docker attach container1" for Docker® containers. In another example, the command may be "lxc -attach -n container1" for Linux® containers (LXC®).

After connecting the monitor application container to the virtualization engine, the containerized monitor application is provisioned (320). Provisioning is the process of configuring the monitor application such as providing the required privileges, connecting the monitor application to the load balancer, providing access to the filesystem of the application being monitored and/or its host, etc.

Containerized application monitoring a containerized application allows the ability to leverage the virtualization management tools such as tracking the communication between the monitor application and the containerized application, validating the deployment and provisioning of the monitor application and application to ensure both are working properly, etc.

Figure 4:
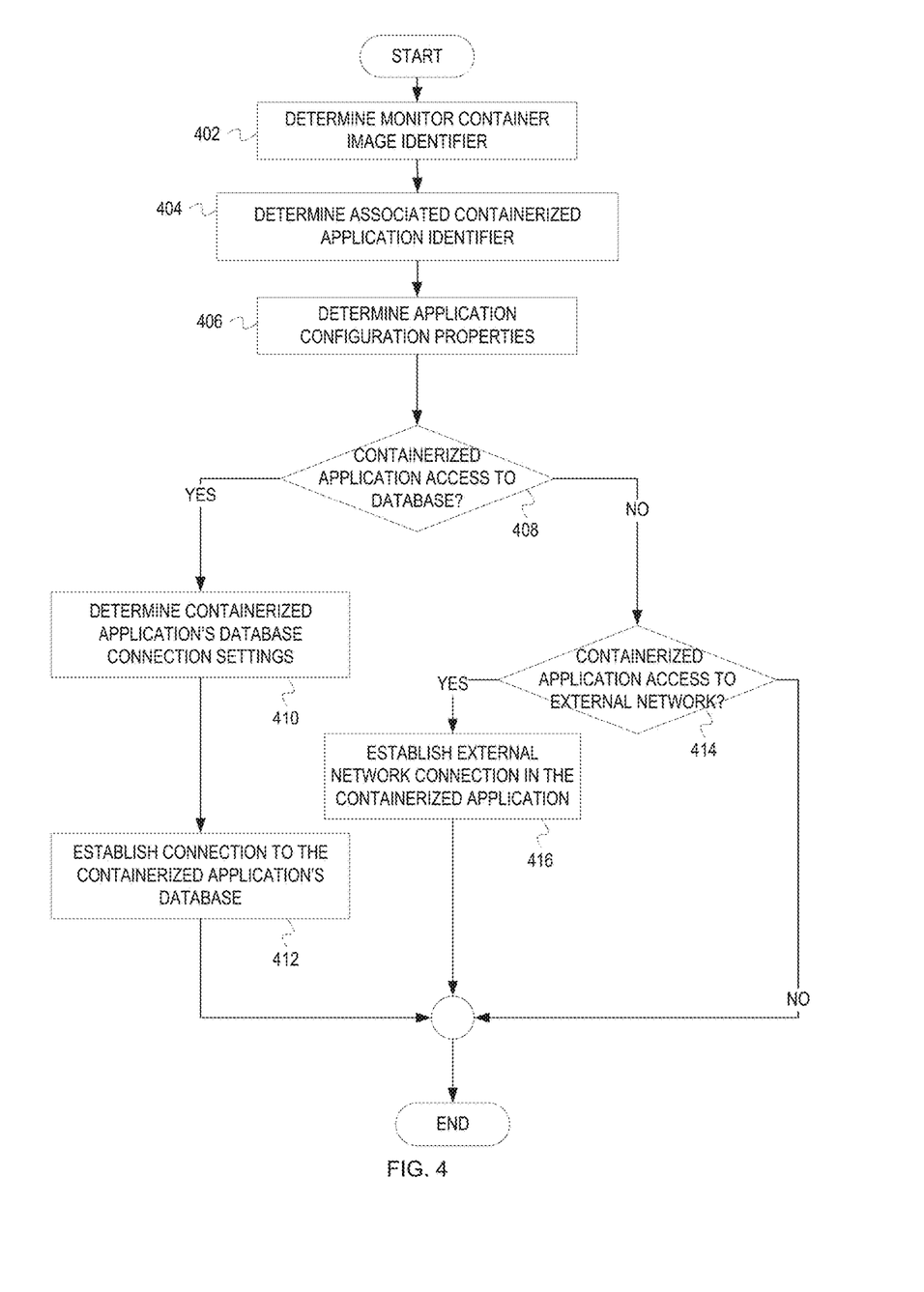
FIG. 4 is a flow diagram illustrating operation and functions for determining the configuration of the containerized application and setting the appropriate connections with the containerized monitor application.

FIG. 4 is a flow diagram illustrating operation and functions for determining the configuration of the containerized application and configuring the appropriate connections with the containerized monitor application, typically done during provisioning of the containerized monitor application. With the monitor container image having been installed in the containerized application's host system, the application manager determines the containerized monitor's identifier (402). The application manager determines the monitor container ID using various techniques. For example, the application manager may parse the monitor container properties file to determine the monitor container ID. In another implementation, the application manager may query a monitor container image repository to determine the identifier.

After determining the monitor container identifier, the application manager determines the associated containerized application's identifier (404). The application manager may determine the containerized application's identifier using one of various techniques. For example, the application manager may parse the containerized application's properties file. In another implementation, the application manager may query its database for the identifier of the associated containerized application.

Using the containerized application ID, the application manager determines the operational configuration of the containerized application (406). The application manager may determine the containerized application's operational configuration using one of various techniques. For instance, the application manager may locate and parse the containerized application's properties file or may query the application manager's database for the containerized application's configuration details.

Using the determined containerized application's operational configuration information, the application manager determines whether the containerized application uses a database (408). For instance, the application manager utilizes the configuration details from the parsed properties file to determine whether a database ID or other indicator (e.g., flag) signals that a database is used by the application. Alternatively, the application manager may use the result from the database query in block 406.

If the containerized application uses a database, the application manager determines the connection settings (410). The database connection settings may include information such as the connection URI and/or username and password. The containerized application's database connection settings may be determined using the configuration details extracted in block 406. The connection settings may include an IP address to be used in established a network connection.

After determining the containerized application's database settings, the application manager installs a database connection toolkit component (e.g. JDBC) in the monitor application and establishes a connection between the monitor application and the containerized application's database using the component (412). The monitor application may be connected using an operating system (OS) authentication. In another implementation, the database may be bound or mounted to the containerized application. In yet another implementation, a link between the application database container and the monitor application may be used to establish connection.

If the containerized application does not use a database, then the monitor application determines if the containerized application needs web access (414). For example, the application manager determines if the containerized application is a web container. For example, the monitor application will detect if the application container has Apache® process running. In another implementation, the application manager used the configuration details queried from the application manager database. If the containerized application requires web access, then the appropriate port (e.g. port 80) may be exposed (416).

Figure 5:
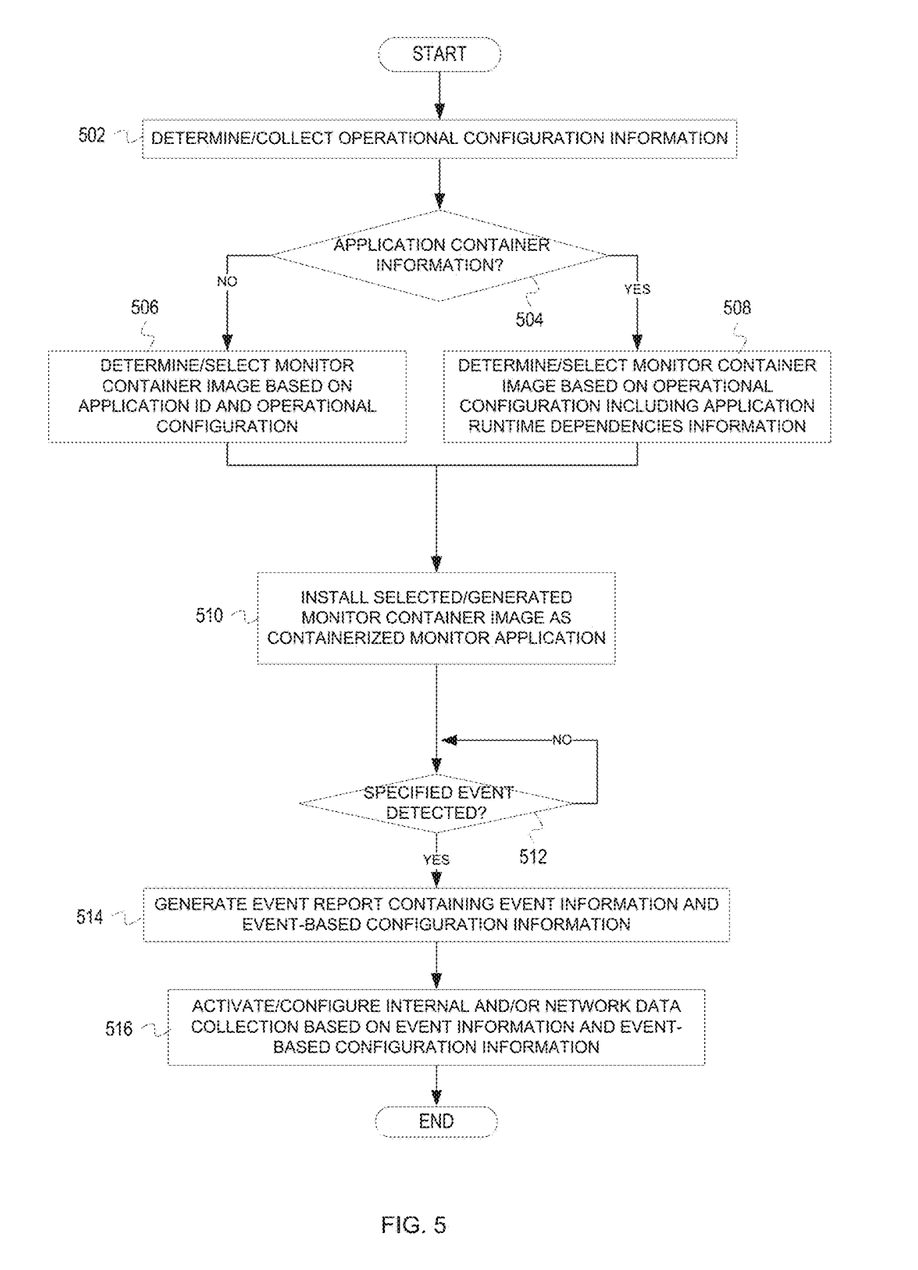
FIG. 5 is a flow diagram depicting operations and functions for monitoring a containerized application in accordance with some embodiments.

FIG. 5 is a flow diagram depicting operations and functions for monitoring a containerized application in accordance with some embodiments. The operations and functions depicted in FIG. 5 may be performed by one or more of the systems, devices, and components described with reference to FIGS. 1 and 2. The process begins with an application manager determining whether to monitor an installed containerized application, and in response, collecting operational configuration information for the containerized application (502). For instance, the application manager may read a properties file for the containerized application to determine the host operating system type and version. Other operational configuration information may include database and file system components and connections used by the containerized application.

The application manager may select a monitor container image based in part on the containerized application ID and the operational configuration information. The application manager may utilize application container image information to select a corresponding monitor container image. If application container information for the containerized application is not available, the application manager selects or generates a monitor container image based on the application ID and the determined operational configuration information (504, 506). If application container information for the containerized application is available, the application manager selects or generates a monitor container image based, in part, on the resource dependency information in the image as well as on the application ID and the determined operational configuration information (504, 508). Having selected or generated the monitor container image, the application manager installs the image on the system hosting the containerized application as a containerized monitor application (510).

In some embodiments, the containerized monitor application is configured to operate in a default no collection mode in which only a monitor agent is activated to detect whether one or more specified events occur in association with operation of the containerized application. In response to detecting one or more of the specified events, the monitor agent generates and sends an event report to other monitor application components (512, 514). In response to the event report, the containerized monitor application configures and activates data collection processes based on event-based data in the event report (516).

Variations

The examples often refer to an application monitoring system. The application monitoring system is a construct used to refer to implementation of functionality for monitoring performance and tracking of issues of containerized software applications in production environments. Software issues might be caused by various factors such as faulty code, lack of resources, or incompatibility with the operating system. This construct is utilized since numerous implementations are possible. For example, the examples disclosed herein refer to a client and server communication, however the disclosure may also be configured to monitor at least two applications that are communicating with each other. In addition, applications being monitored are not limited to web applications.

In another example, the monitor application may also inspect network traces for security breaches. Security breach may include attempts to violate security policies for example. In yet another example, the application monitoring system may monitor the containerized application for a certain period of time for the purpose of identifying performance trends. The application monitoring system may analyze and summarize the data and publish the result in a report or file. The trend and/or summary report may also be viewed in real time through a dashboard for example. In a last example, instead of collecting data from the containerized application, the application provides the data to the application monitoring system or the containerized monitor application.

The application monitoring system may have two or more modes (e.g., test, production mode). Production mode may involve collecting, monitoring and/or managing the production containerized applications and monitor applications. Test modes may include debugging the application's behavior in addition to the aforementioned functions. Debugging is the process of locating and resolving why an application is behaving unexpectedly.

The application monitoring system may comprise various debugging tools, in addition to the monitor application, enabling the system to monitor program execution, step through instructions, modify values, and examine stack traces. Debugging may include controlling the execution of the application by using breakpoints, for example. A breakpoint is a signal to the debugger to temporarily suspend the execution of the application allowing for the inspection of the state of the program. The system may also have a component that manages several monitor containers which may perform all or a subset of the aforementioned functionality. The system may also use a service discovery to detect various components such as the containerized application it monitors.

The state of the containerized application and the associated monitor container may be saved by creating images of both the target application and the monitor application (application container image and monitor container image). These images may then be deployed in the development, test or staging environment for various purposes such as possibly reconstructing or replicating the scenario that led to the production issue. In addition, data between the components (e.g., client, server) and/or the host such as the communication, log files may be saved and used in the reconstruction or replication. The option to allow a person debugging the application to dynamically change and/or interact with data (e.g., HTTP request and/or response) maybe provided as well.

The application monitoring system may also be dynamic and/or reactive to the state of the application, for instance automatically change the type of and/or amount of data that needs to be collected. In addition, the system may also add or remove a certain component from data collection. For example, the application monitoring system may decide that collecting data from the application's database is no longer necessary. The application monitoring system may also change the format of the data collected before or after storing the data in the database.

In the disclosure above, the application monitoring system deploys a monitor container to monitor a containerized application. The monitor container holds several components such as the configuration analyzer and data analyzer. However, these components may also be in its own container and thus the application monitoring system may deploy one or more monitor containers each with the same or different components. These monitor containers may be able to communicate with each other, share and/or coordinate the data collection, file systems and/or data summarizing and reporting process.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 402 and 404 can be performed in parallel or concurrently. With respect to FIG. 3, block 312 is not necessary. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
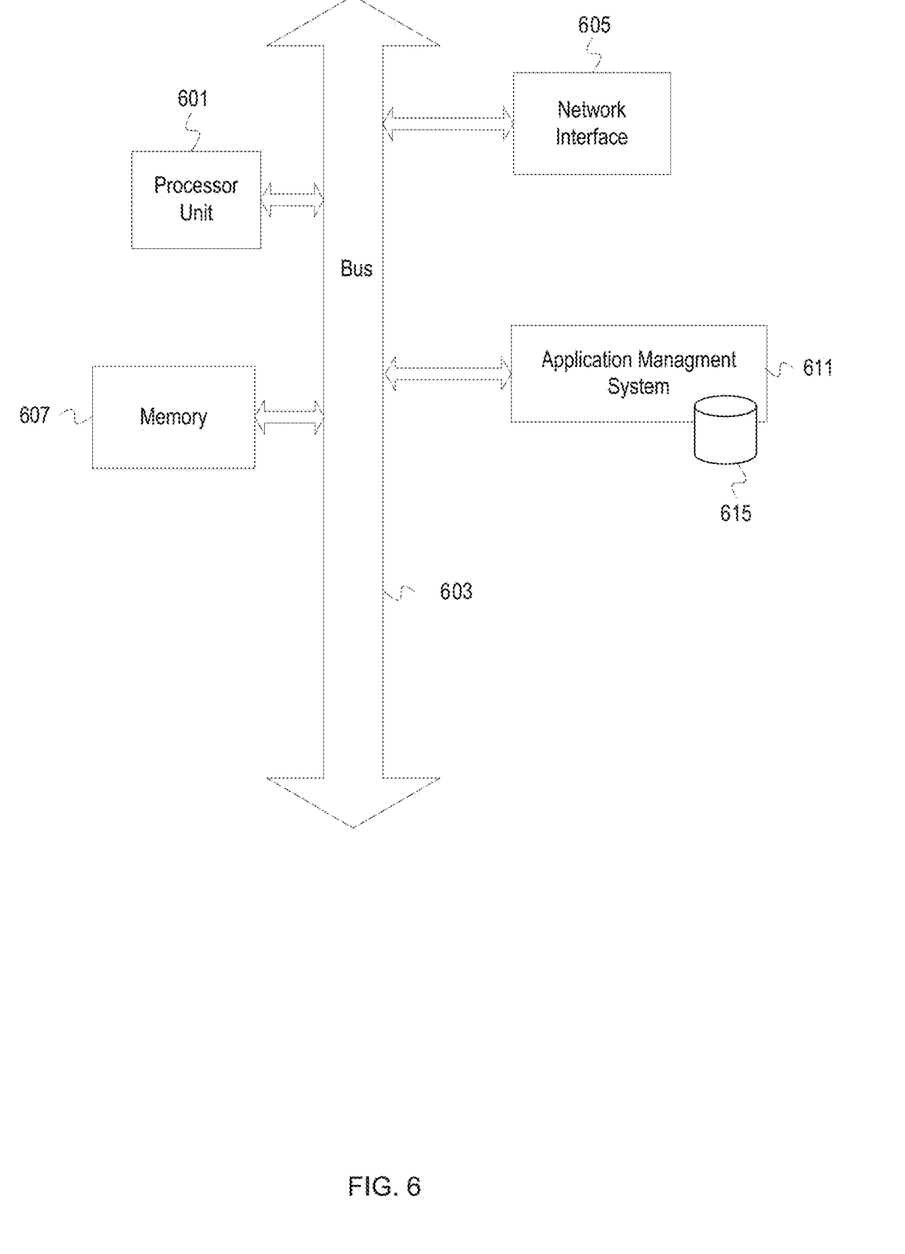
FIG. 6 depicts an example computer system with an application monitoring system.

FIG. 6 depicts an example computer system with an application monitoring system. The computer system includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport® bus, InfiniBand® bus, NuBus, etc.) and a network interface 605 (e.g., a Fiber Channel interface, an Ethernet interface, an internet small computer system interface, SONET interface, wireless interface, etc.). The system also includes an application monitoring system 611. The resource monitoring system 611 also includes an application monitoring system data and image repository 615. Any one of the previously described functionalities may be partially (or entirely) implemented in hardware and/or on the processor unit 601. For example, the functionality may be implemented with an application specific integrated circuit, in logic implemented in the processor unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601 and the network interface 605 are coupled to the bus 603. Although illustrated as being coupled to the bus 603, the memory 607 may be coupled to the processor unit 601.

While the aspects of the disclosure are described with reference to various implementations and exploitations, it will be understood that these aspects are illustrative and that the scope of the claims is not limited to them. In general, techniques for containerized application monitoring as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

What is claimed is:

1. A method for monitoring containerized applications, said method comprising:
   detecting installation of a first containerized application within an application server, wherein the first containerized application comprises application program instructions and application runtime environment components that operate as a distinct execution unit managed by a virtualization engine and an operating system kernel;
   based on determining that the first containerized application is not associated with a monitor container image,
      determining an operational configuration of the first containerized application within the application server;
      selecting a first monitor container image based, at least in part, on the determined operational configuration and a first application container image of the first containerized application; and
      installing the first monitor container image as a first containerized monitor application within the application server, wherein the first containerized monitor application comprises monitor program instructions and monitor runtime environment components that operate as a distinct execution unit managed by the virtualization engine and the operating system kernel that manage runtime processes of the first containerized application;
   detecting installation of a second containerized application within the application server; and
   based on detecting installation of the second containerized application and based on determining that the second containerized application is associated with a second monitor container image, installing the second monitor container image as a second containerized monitor application within the application server, wherein the second containerized monitor application comprises monitor program instructions and monitor runtime environment components that operate as a distinct execution unit managed by the virtualization engine and the operating system kernel that manage runtime processes of the second containerized application.

2. The method of claim 1, wherein the application server is communicatively coupled to an application management server in which a plurality of monitor container images and a plurality of application container images are recorded, and wherein said selecting the first monitor container image comprises:
   accessing the plurality of application container images to identify and retrieve the first application container image;
   identifying the application runtime environment components from the first application container image; and
   selecting one of the plurality of monitor container images based, at least in part, on the application runtime environment components.

3. The method of claim 1, wherein the first application container image includes the application runtime environment components that operate with the application program instructions as a distinct execution unit managed by the virtualization engine and the operating system kernel, and wherein the first monitor container image includes at least one of:
   the application runtime environment components; and
   monitoring program instructions that operate with at least one of the application runtime environment components as a distinct execution unit managed by the virtualization engine.

4. The method of claim 1, further comprising:
   configuring the first containerized monitor application to operate in an inactive mode in which data collection is not performed; and
   based on detecting a specified event, activating data collection by the first containerized monitor application, wherein said activating data collection comprises configuring data collection based, at least in part, on an error identified in the specified event.

5. The method of claim 4, further comprising:
determining from the error identified in the specified event, a data source associated with the specified event; and
configuring the data collection based, at least in part, on the determined data source.

6. The method of claim 1, wherein said determining the operational configuration of the first containerized application comprises:
identifying the application runtime environment components from an application container image file; and
determining a data source to be accessed by the first containerized monitor application based on at least one of the application runtime environment components.

7. The method of claim 1, further comprising:
based on determining that the first containerized application is in a software as a service client access configuration,
configuring the first containerized monitor application to serve as a proxy for a network traffic load balancer of the first containerized application; and
configuring the first containerized monitor application to direct network traffic to the first containerized application.

8. The method of claim 1, wherein determining that the second containerized application is associated with the second monitor container image comprises:
determining an identifier associated with the second containerized application;
identifying the second monitor container image based, at least in part, on the identifier; and
downloading the second monitor container image from an application management server to the application server.

9. One or more non-transitory machine-readable media having program code for monitoring containerized applications, the program code to:
detect installation of a first containerized application within an application server, wherein the first containerized application comprises application program instructions and application runtime environment components that operate as a distinct execution unit managed by a virtualization engine and an operating system kernel;
based on determining that the first containerized application is not associated with a monitor container image,
determine an operational configuration of the first containerized application within the application server;
select a first monitor container image based, at least in part, on the determined operational configuration and a first application container image of the first containerized application; and
install the first monitor container image as a first containerized monitor application within the application server, wherein the first containerized monitor application comprises monitor program instructions and monitor runtime environment components that operate as a distinct execution unit managed by the virtualization engine and the operating system kernel that manage runtime processes of the first containerized application;
detect installation of a second containerized application within the application server; and
based on detecting installation of the second containerized application and based on a determination that the second containerized application is associated with a second monitor container image, install the second monitor container image as a second containerized monitor application within the application server, wherein the second containerized monitor application comprises monitor program instructions and monitor runtime environment components that operate as a distinct execution unit managed by the virtualization engine and the operating system kernel that manage runtime processes of the second containerized application.

10. The machine-readable media of claim 9, wherein the application server is communicatively coupled to an application management server in which a plurality of monitor container images and a plurality of application container images are recorded, and wherein the program code to select the first monitor container image comprises program code to:
access the plurality of application container images to identify and retrieve the first application container image;
identify the application runtime environment components from the first application container image; and
select one of the plurality of monitor container images based, at least in part, on the application runtime environment components.

11. The machine-readable media of claim 9, wherein the first application container image includes the application runtime environment components that operate with the application program instructions as a distinct execution unit managed by the virtualization engine and the operating system kernel, and wherein the first monitor container image includes at least one of:
the application runtime environment components; and
monitoring program instructions that operate with at least one of the application runtime environment components as a distinct execution unit managed by the virtualization engine.

12. The machine-readable media of claim 9, wherein the program code further comprises program code to:
configure the first containerized monitor application to operate in an inactive mode in which data collection is not performed; and
based on detecting a specified event, activate data collection by the first containerized monitor application, wherein the program code to activate data collection comprises program code to configure data collection based, at least in part, on an error identified in the specified event.

13. The machine-readable media of claim 12, wherein the program code further comprises program code to:
determine from the error identified in the specified event, a data source associated with the specified event; and
configure the data collection based, at least in part, on the determined data source.

14. The machine-readable media of claim 9, wherein the program code to determine the operational configuration of the first containerized application comprises program code to:
identify the application runtime environment components from an application container image file; and
determine a data source to be accessed by the first containerized monitor application based on at least one of the application runtime environment components.

15. The machine-readable media of claim 9, further comprising program code to:
  based on determining that the first containerized application is in a software as a service client access configuration,
    configure the first containerized monitor application to serve as a proxy for a network traffic load balancer of the first containerized application; and
    configure the first containerized monitor application to direct network traffic to the first containerized application.

16. The machine-readable media of claim 9, wherein the program code to determine that the second containerized application is associated with the second monitor container image comprises:
  determining an identifier associated with the second containerized application;
  identifying the second monitor container image based, at least in part, on the identifier; and
  downloading the second monitor container image from an application management server to the application server.

17. An apparatus comprising:
  a processor; and
  a machine-readable medium having program code executable by the processor to cause the apparatus to:
    detect installation of a first containerized application within an application server, wherein the first containerized application comprises application program instructions and application runtime environment components that operate as a distinct execution unit managed by a virtualization engine and an operating system kernel;
    based on determining that the first containerized application is not associated with a monitor container image,
      determine an operational configuration of the first containerized application within the application server;
      select a first monitor container image based, at least in part, on the determined operational configuration and a first application container image of the first containerized application; and
      install the first monitor container image as a first containerized monitor application within the application server, wherein the first containerized monitor application comprises monitor program instructions and monitor runtime environment components that operate as a distinct execution unit managed by the virtualization engine and the operating system kernel that manage runtime processes of the first containerized application;
    detect installation of a second containerized application within the application server; and
    based on detecting installation of the second containerized application and based on a determination that the second containerized application is associated with a second monitor container image, install the second monitor container image as a second containerized monitor application within the application server, wherein the second containerized monitor application comprises monitor program instructions and monitor runtime environment components that operate as a distinct execution unit managed by the virtualization engine and the operating system kernel that manage runtime processes of the second containerized application.

18. The apparatus of claim 17, wherein the application server is communicatively coupled to an application management server in which a plurality of monitor container images and a plurality of application container images are recorded, and wherein the program code to select the first monitor container image further comprises program code executable by the processor to cause the apparatus to:
  access the plurality of application container images to identify and retrieve the first application container image;
  identify the application runtime environment components from the first application container image; and
  select one of the plurality of monitor container images based, at least in part, on the application runtime environment components.

19. The apparatus of claim 17, wherein the program code further comprises program code executable by the processor to cause the apparatus to:
  configure the first containerized monitor application to operate in an inactive mode in which data collection is not performed; and
  based on detecting a specified event, activate data collection by the first containerized monitor application, wherein the program code to activate data collection comprises program code to configure data collection based, at least in part, on an error identified in the specified event.

20. The apparatus of claim 19, wherein the program code further comprises program code executable by the processor to cause the apparatus to:
  determine from the error identified in the specified event, a data source associated with the specified event; and
  configure the data collection based, at least in part, on the determined data source.

* * * * *